(12) United States Patent
Doyle et al.

(10) Patent No.: US 7,676,239 B1
(45) Date of Patent: Mar. 9, 2010

(54) SYSTEM AND METHOD FOR PROVIDING A POWER CONTROLLER WITH FLAT AMPLITUDE AND PHASE RESPONSE

(75) Inventors: James T. Doyle, Nederland, CO (US); Dae Woon Kang, Boulder, CO (US)

(73) Assignee: National Semiconductor Corporation, Santa Clara, CA (US)

( * ) Notice: Subject to any disclaimer, the term of this patent is extended or adjusted under 35 U.S.C. 154(b) by 793 days.

(21) Appl. No.: 11/065,172

(22) Filed: Feb. 24, 2005

(51) Int. Cl.
*H04B 7/00* (2006.01)

(52) U.S. Cl. .................. 455/522; 455/523; 455/114.3; 455/136; 455/187.1

(58) Field of Classification Search .............. 455/522, 455/523
See application file for complete search history.

(56) References Cited

U.S. PATENT DOCUMENTS

| | | | |
|---|---|---|---|
| 6,373,902 B1 * | 4/2002 | Park et al. | .................. 375/296 |
| 6,646,511 B2 * | 11/2003 | Canyon et al. | .............. 330/297 |
| 6,701,138 B2 | 3/2004 | Epperson et al. | |
| 6,757,526 B1 | 6/2004 | Sharp et al. | |
| 6,788,141 B2 | 9/2004 | Paul et al. | |
| 2002/0137535 A1 * | 9/2002 | Hunzinger | .................. 455/522 |
| 2004/0164803 A1 * | 8/2004 | Canyon et al. | .............. 330/285 |
| 2004/0203982 A1 * | 10/2004 | Barak et al. | .................. 455/522 |
| 2005/0197153 A1 * | 9/2005 | Kim et al. | ................. 455/552.1 |

\* cited by examiner

*Primary Examiner*—Matthew D Anderson
*Assistant Examiner*—Adel Youssef

(57) ABSTRACT

A method for operating a power controller in a wireless communication device is provided that includes generating a power controller output signal using an open loop polar modulation scheme. The power controller output signal is operable to control the power delivered to a high-band power amplifier and a low-band power amplifier. A band state is determined for the wireless communication device. The power controller output signal is provided to the high-band power amplifier when the band state is a high-band state and to the low-band power amplifier when the band state is a low-band state.

16 Claims, 5 Drawing Sheets

SYSTEM AND METHOD FOR PROVIDING A POWER CONTROLLER WITH FLAT AMPLITUDE AND PHASE RESPONSE

TECHNICAL FIELD OF THE INVENTION

The present invention relates generally to wireless communication and, more particularly, to a system and method for providing a power controller with flat amplitude and phase response in a wireless communication device. The primary use is for higher efficiency linear modulation standards (such as EDGE and WCDMA) using polar modulation control to the power amplifier (PA).

BACKGROUND OF THE INVENTION

Demand for multi-mode and multi-band operation, longer battery life, and smaller size in cellular equipment is increasing. For example, in 3 G UMTS, mobile handsets will have to support at least two standards (e.g., 900 and 1800 MHz GSM) and at least two completely different modulation schemes (e.g., CDMA and AMPS). To have these multiple bands and modes available in a mobile, the uplink power has a significant impact on the coverage and quality of service experienced by the subscriber. The transmitter power amplifier is responsible for over ½ of the cellular phone battery life. Furthermore, the transmit power amplifier is the most inefficient module in the cellular phone and getting worse as the technology demands increase.

On the other hand, linear power amplifiers significantly impact the power controller requirements for gain and phase linearity in new standards such as EDGE (2.5 G) and UMTS WCDMA (3 G) because any non-linearities associated with the power controller amplifier cause both amplitude and phase distortion. In order to reduce both amplitude and phase distortion (AM to AM and AM to PM), high-efficiency linear power-delivery methods which are linearized are needed.

The function of the power control chip is to maintain an accurate control voltage when variations of process, supply voltage, and temperature (PVT) are encountered. When a power amplifier controller is used, the power amplifier's response is a function of the power amplifier and the controller circuit instead of the power amplifier transfer function alone. One approach to controlling power to the power amplifier is a power-sensing method. The power-sensing (base or input control) method is highly non-linear, and in turn needs a closed feedback loop design including a radio frequency power detector. The closed loop controls the base voltage of a field-effect transistor, with the error voltage generated by applying a ramp voltage and the current supplied to the power amplifier through a power detector.

However, since most traditional GaAs HBT power amplifiers provide no power-detection capability, a power sensor (usually a log amplifier) is used in closed-loop systems in order to estimate the power of the power amplifier. A disadvantage of this approach is that the handset may be drawing more power as needed (0.3 db loss at the antenna), depending upon the circumstances. As a result, these low-accuracy control schemes can waste valuable power, and in turn lead to shorter battery life. In addition, difficult issues are left to be resolved, such as non-linearity between the power amplifier and detector, small dynamic range, and long calibration time in a closed-loop power controller. These systems, which use power detectors and directional couplers to provide feedback, are relatively costly, large, and inefficient.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; "each" means every one of at least a subset of the identified items; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future, uses of such defined words and phrases.

BRIEF DESCRIPTION OF THE DRAWINGS

For a more complete understanding of the present invention and its advantages, reference is now made to the following description taken in conjunction with the accompanying drawings, wherein like reference numerals represent like parts, in which.

DETAILED DESCRIPTION OF THE INVENTION

FIGS. 1 through 7, discussed below, and the various embodiments used to describe the principles of the present invention in this patent document are by way of illustration only and should not be construed in any way to limit the scope of the invention. Those skilled in the art will understand that the principles of the present invention may be implemented in any type of suitably arranged power controller.

Figure 1:
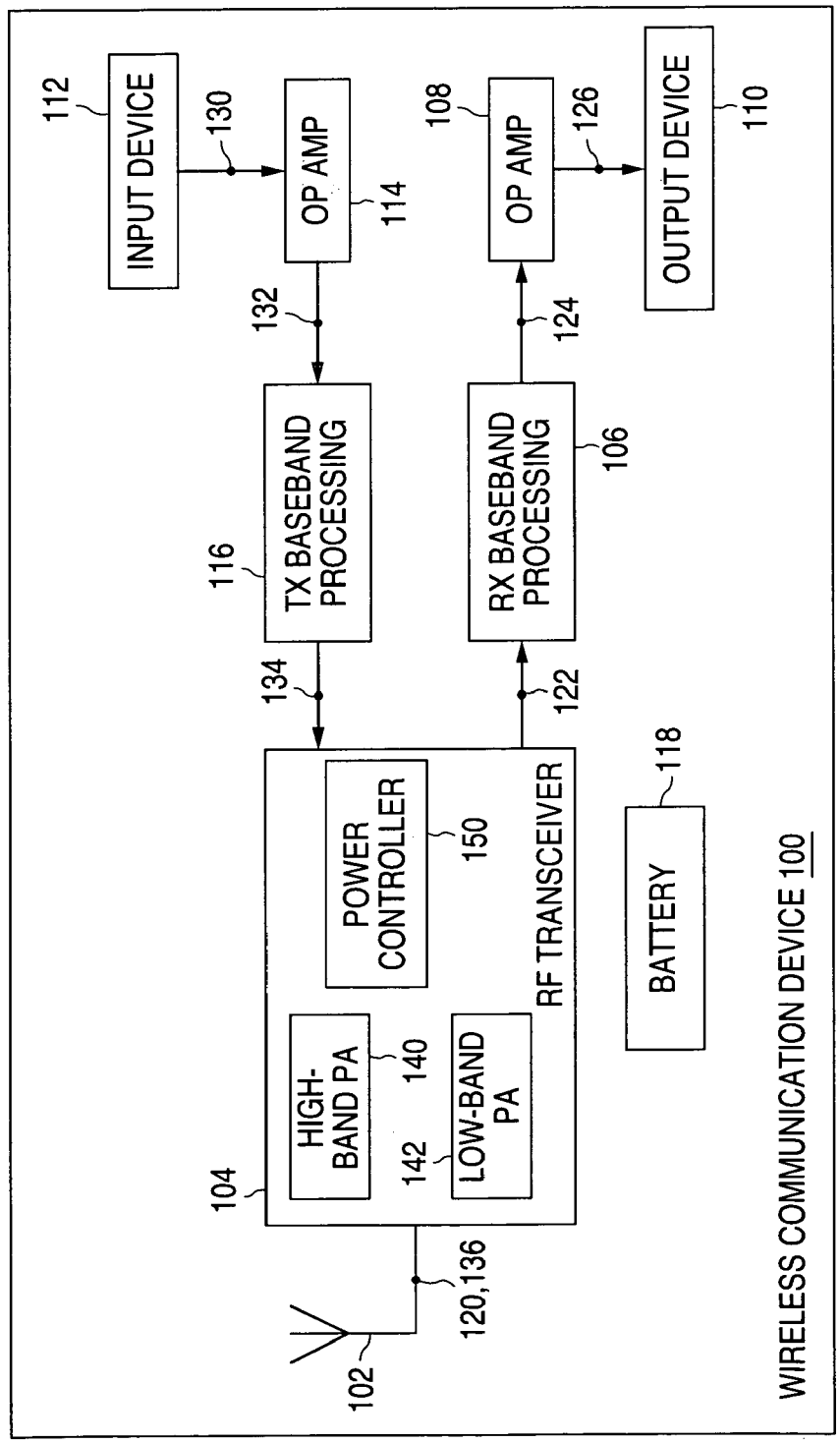
FIG. 1 is a block diagram illustrating a wireless communication device in accordance with one embodiment of the present invention.

FIG. 1 is a block diagram illustrating a wireless communication device 100 in accordance with one embodiment of the present invention. The wireless communication device 100 may comprise a mobile wireless device, such as a cell phone, a PCS handset, a personal digital assistant (PDA) handset, a portable computer, a telemetry device, or the like, or any other suitable device operable to communicate via a wireless interface, including a stationary wireless device. For one embodiment, the wireless communication device 100 is operable to communicate with a base station (not shown in FIG. 1) using code division multiple access (CDMA), wideband CDMA (WCDMA), advanced mobile phone system (AMPS), global system for mobile communications (GSM), enhanced data for GSM evolution (EDGE), universal mobile telecommunications system (UMTS), or any other suitable modulation standard. The wireless communication device 100 is operable to use a polar modulation scheme.

According to one embodiment, the wireless communication device 100 comprises an antenna 102, a radio frequency (RF) transceiver 104, a receive (RX) baseband processing block 106, a receive operational amplifier (op amp) 108, an output device 110, an input device 112, a transmit operational amplifier 114, a transmit (TX) baseband processing block 116, and a battery 118.

In the receive path, the RF transceiver 104 receives from the antenna 102 an incoming (i.e., forward channel) RF signal 120 and performs down-conversion and demodulation to produce a forward channel baseband signal 122. The receive baseband processing block 106 performs additional processing functions on the forward channel baseband signal 122, such as automatic gain control, error correction, de-interleaving, analog-to-digital conversion, and the like.

For one embodiment, at least a portion of the forward channel baseband signal 122 may be converted to an analog signal 124 (e.g., an audio signal) that is transferred to the receive operational amplifier 108. The receive operational amplifier 108 generates an amplified analog signal 126 based on the analog signal 124 by amplifying the analog signal 124 to a suitable power level to drive the output device 110. For this embodiment, the output device 110 may comprise a speaker. For another embodiment, the signal 124 is provided directly to the output device 110, which may comprise a display. It will be understood that the output device 110 may comprise any suitable device operable to provide the content of the RF signal 120, after suitable processing, to the user of the wireless communication device 100.

In the transmit path, for one embodiment, the input device 112 converts input data, such as the voice of the user of the wireless communication device 100 or other suitable input data, to an analog signal 130 that is amplified by the transmit operational amplifier 114 to generate an amplified analog signal 132. For this embodiment, the input device 112 may comprise a microphone.

The transmit baseband processing block 116 receives the amplified analog signal 132 and performs additional processing functions, such as automatic gain control, error encoding, interleaving, digital-to-analog conversion, and the like. In essence, the transmit baseband processing block 116 performs the opposite of many of the functions performed by the receive baseband processing block 106.

For another embodiment, the signal 130 is provided directly to the transmit baseband processing block 116. For this embodiment, the input device 112 may comprise a keyboard, a key pad or other type of data entry device. It will be understood that the input device 112 may comprise any suitable device operable to provide the input data received from the user of the wireless communication device 100, after suitable processing, to the antenna 102 for transmission over the wireless interface.

The output of the transmit baseband processing block 116 is a reverse channel baseband signal 134. The RF transceiver 104 performs modulation and up-conversion of the reverse channel baseband signal 134 to produce an outgoing RF signal 136 that is transmitted by the antenna 102 over the wireless interface.

The battery 118 is operable to provide power for operating the wireless communication device 100. The battery 118 may be charged by being plugged into an electrical outlet or by any other suitable means. The battery 118 is then discharged by powering the wireless communication device 100. The amount of time that the battery 118 functions without needing to be recharged is referred to as the battery life. The length of the life varies based on power consumption in the wireless communication device 100. For example, when the wireless communication device 100 is powered on but not sending or receiving any communication, the battery life is much longer than the battery life when the wireless communication device 100 is continuously communicating. Many factors determine the maximum battery life for a particular wireless communication device 100, such as the drain on the battery 118 due to a transmitter power amplifier.

According to the illustrated embodiment, the RF transceiver 104 comprises a high-band power amplifier (PA) 140, a low-band power amplifier 142, and a power controller 150 that is operable to control the power delivered from the battery 118 to the power amplifiers 140 and 142. However, it will be understood that the power amplifiers 140 and 142 and the power controller 150 may be implemented in any suitable component of the wireless communication device 100, in addition to being implemented separately from the other components of the wireless communication device 100 without departing from the scope of the present invention.

For one embodiment, the high-band power amplifier 140 comprises a Digital Cellular System (DCS) power amplifier, and the low-band power amplifier 142 comprises a GSM power amplifier. However, it will be understood that the power amplifiers 140 and 142 may comprise any suitable power amplifiers without departing from the scope of the present invention.

As described in more detail below, the power controller 150 comprises a CMOS controller that is operable to optimize each circuit block function for PSRR and circuit parameter sensitivities by providing higher gain than the function requires. To accomplish this, two bias amplifiers in the power controller 150 are operable to drive the independent GaAs power amplifiers 140 and 142 with a relatively constant input voltage (e.g., 2.8 volts bias) regardless of the RF input signal (fixed amplitude approximately 0 dbm). The bias amplifiers select one of the power amplifiers 140 or 142 based on the application. A low-dropout (LDO) or power delivery amplifier allows the power controller 150 to adjust the power output of the selected power amplifier 140 or 142. Using independent GaAs power amplifiers 140 and 142 allows more optimal efficiency and matching to facilitate high/low band amplifiers (e.g., DCS 1.8 Ghz and GSM 800 Mhz). In this way, the efficiencies of the power amplifiers 140 and 142 are improved, thereby increasing the life of the battery 118. Because the power controller 150 is a CMOS controller and the power amplifiers 140 and 142 are GaAs amplifiers, the power controller (CMOS) 150 performs temperature tracking compensation in generating an output power. Since this approach is open loop, both technologies are precisely matched. This is accomplished by precise design centering with no trims. In addition, using the CMOS/GaAs combination as described in the present disclosure, the GaAs power amplifiers 140 and 142 are robust as compared to CMOS or SiGe power amplifiers, which are susceptible to blowing up at high voltages and high VSWRs (40:1).

Figure 2:
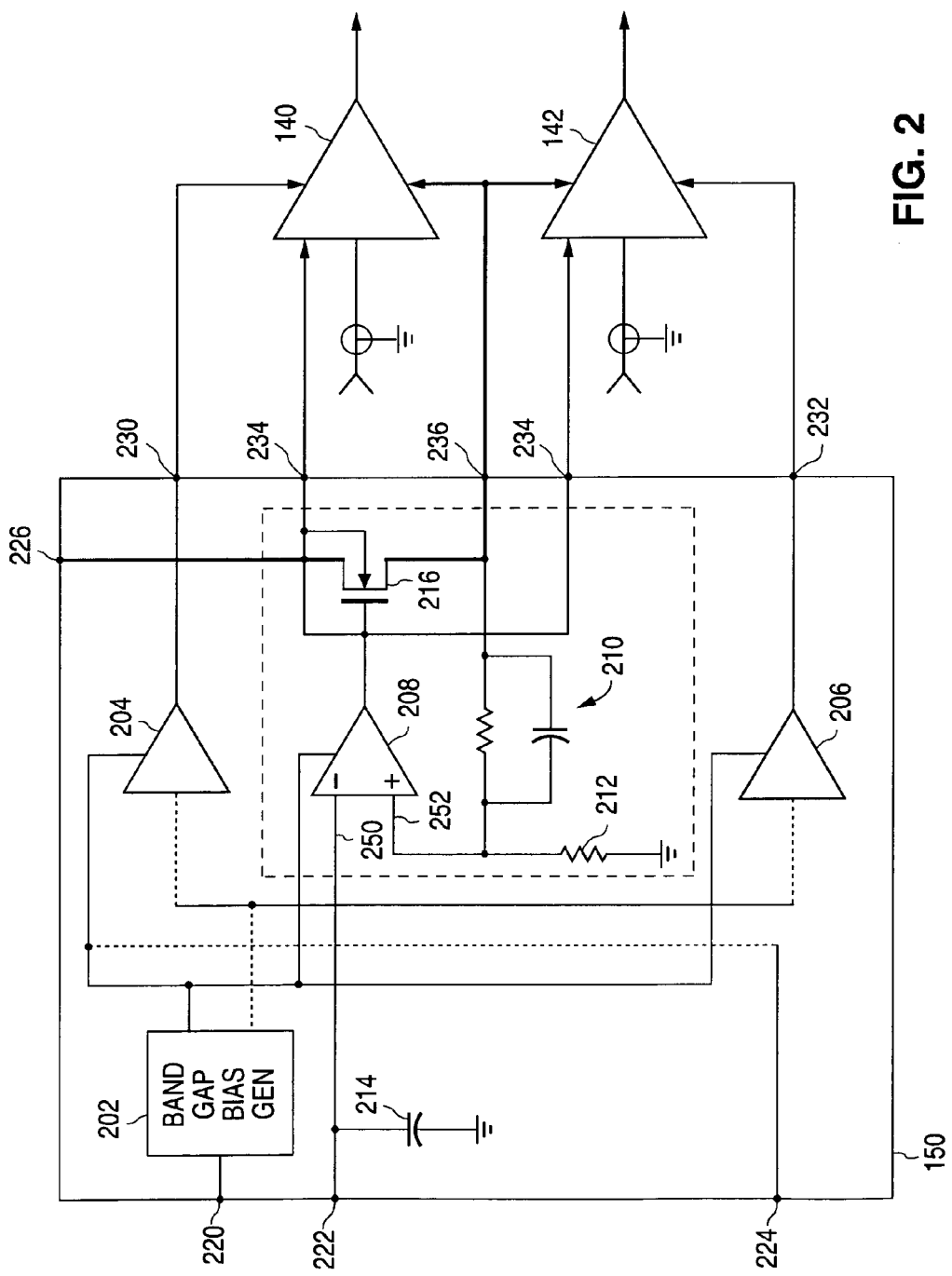
FIG. 2 is a block diagram illustrating the power controller and power amplifiers of FIG. 1 in accordance with one embodiment of the present invention.

FIG. 2 is a block diagram illustrating the power amplifiers 140 and 142 and the power controller 150 in accordance with one embodiment of the present invention. The power amplifiers 140 and 142 each comprise an independent GaAs power amplifier that is external to the power controller 150.

The power controller 150 comprises a bandgap bias generator 202, a pair of bias buffers 204 and 206, a gain setting amplifier 208, an RC filter or load 210, a gain setting feedback resistor 212, an input capacitor 214, and an output transistor 216. The power controller 150 is operable to receive an enable signal 220, a ramp voltage 222, a band select signal 224, and a battery voltage 226 and to generate a high-band control voltage 230, a low-band control voltage 232, a battery output voltage 234, and a power controller output signal 236.

For one embodiment, the power controller 150 is also operable to receive a mode select signal (not shown in FIG. 2) that selects between two or more possible modes, such as a standard mode and a linear and polar EDGE mode, for example. Additional bias control pins have been added for this purpose. For this embodiment, the power controller 150 may comprise an additional bias control pin for providing better linearity or polar EDGE operation.

The control voltages 230 and 232 are operable to activate the high-band power amplifier 140 and the low band power amplifier 142, respectively, based on which bias buffer 204 or 206 is selected by the band select signal 224 through a pair of switches. The battery output voltage 234 is operable to supply power to the power amplifiers 140 and 142. The power controller 150 is operable to modify the amount of current provided to the power amplifiers 140 and 142 by way of the power controller output signal 236.

According to one embodiment, the gain setting amplifier 208 provides a gain of 2.6. In addition, the resistance provided by the resistor in the RC filter 210 comprises about 3 ohms and the capacitance provided by the capacitor in the RC filter 210 comprises about 0.01 microfarad. The capacitance is selected to obtain the desired peaking response, which keeps the transfer function flat in the band region of interest (e.g., 50 Khz to 3 MHz). If the capacitance is changed, this changes the bandwidth, which affects noise and the peaking response. The input capacitor 214 comprises a capacitance of about 10 Pico farads. It will be understood that the resistances provided by the resistor in the RC filter 210 and the gain setting feedback resistor 212 may be any suitable resistances and the capacitances provided by the capacitor in the RC filter 210 and the input capacitor 214 may be any suitable capacitances without departing from the scope of the present invention. For the RC filter 210, the resistance is set by the load while the capacitance can be adjusted for the desired peaking response and gain flatness.

In operation, according to one embodiment, the bandgap bias generator 202 receives the enable signal 220 and generates an activation signal for either the bias buffer 204 or the bias buffer 206 and generates a control voltage to be buffered by the activated bias buffer 204 or 206. The control voltage and the corresponding RF performances of the power amplifiers 140 and 142 are set by providing an analog, ramp voltage 222 to the input of a CMOS power control chip 150. The input ramp voltage 222, which may be controlled by a digital-to-analog converter in a baseband chip (not shown in FIG. 2), is translated by the input capacitor 214 into a reference voltage 250 that is used for comparison in the open loop circuit. The current flows through the RC filter 210 and is fed into the gain setting resistor 212 to establish a gain setting voltage 252 to be fed to the power amplifier collector.

The power controller 150 also comprises a lookup table that is operable to store power data for the power controller 150. Depending on the power data stored in the look-up table, the power controller 150 sources a corresponding amount of current in the form of the power controller output signal 236. The power data may be generated during production of the wireless communication device 100 by providing input data to the power controller 150 and measuring the power used by the power amplifiers 140 and 142. Later, during use of the wireless communication device 100, the power controller 150 generates the power controller output signal 236 based on the power data in the lookup table that corresponds to the amount of power currently being generated.

Figure 3:
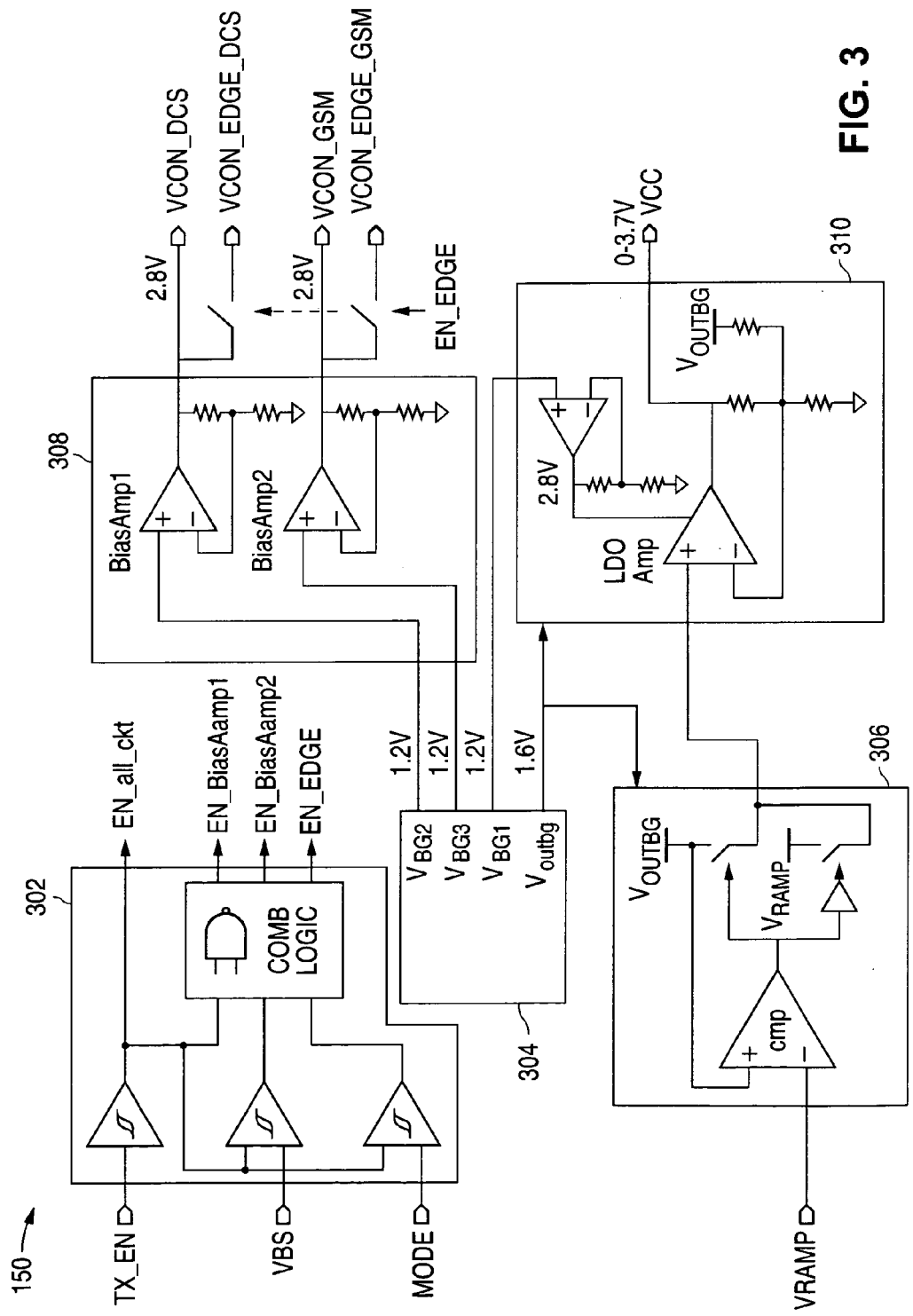
FIG. 3 is a block diagram illustrating details of the power controller of FIG. 2 in accordance with one embodiment of the present invention.

FIG. 3 is a block diagram illustrating details of the power controller 150 in accordance with a particular embodiment of the present invention. It will be understood that other variations of the power controller 150 may be implemented without departing from the scope of the present invention. For this embodiment, the power controller 150 is implemented with enable logic 302, a bandgap generator 304, a clamping circuit 306, a bias amplifier circuit 308, and an LDO amplifier circuit (power delivery amplifier) 310.

This embodiment of the power controller 150 provides multi-band and multi-mode operation, such as GSM, DCS, PCS, GPRS and linear and polar EDGE. To use the power controller 150 in a multi-mode phone, an enable function is included with the enable logic 302, which allows the power controller 150 to be toggled off and on via a digital logic signal (TX_EN). The power controller 150 is able to adjust bias power and meet the stringent slew rate and noise requirements of linear and polar EDGE. A multi-chip module with two separate GaAs power amplifier dies is used for this application.

The enable logic 302 uses a trickle sub-threshold voltage/current reference to insure a sufficient potential for the power down. A P-channel shunt circuit is used to make sure no charge remains on the nodes driving the outputs. The trickle reference input inverter is operational during initial power on. The digital logic enable signal (TX_EN) completely shuts off the supplies and references and allows the amplifier to deliver the power when required. A Schmitt trigger option overcomes high standby current (~10 µA) issues due to hysteresis and a master slave concept which disables all current sneak paths during shutdown (TX_EN low). The trickle source takes advantage of a high resistance poly resistor (2 KΩ/square) to develop a simple series pass reference.

The bandgap generator 304 comprises a medium current (100 µA) design optimized for both low noise and offset without a trim (±3% maximum tolerance). In order to obtain the bandgap potential (1.2V), a multiplied ΔVbe and a Vbe are summed. A folded cascode P-channel input stage is used for low noise offset, eliminating the potential for shut down due to the input stage being biased below the threshold (Vbe<Vt). The ΔVbe gain is realized with current mirroring. In order to reduce noise, the bandwidth of the reference is reduced, and a ground in the immediate vicinity of the bandgap generator 304 is used to minimize coupling noise. Control voltage (Vcon) reference generation is based on taking the bandgap voltage 1.2V and multiplying it using a class-A gain stage. Amplifiers in the power controller 150 operate in the Class A region. The power amplifiers 140 and 142, on the other hand, operate in Class AB to Class B depending on the applied bias.

The LDO amplifier circuit 310 comprises a folded cascode LDO or power delivery amplifier with an internal bandgap reference for the input stage and is used to make the input stage independent of supply voltage variations. A power LDO is a circuit capable of delivering more than 4 A of current to an RF power amplifier in a cell phone handset, for example. Two bias (Vcon) amplifiers use level-shifted inputs (e.g., Bandgap voltage of 1.2 volts is increased to 2.8 volts). In order to keep the quiescent current relatively constant into a load, a class-A amplifier design is used, which has low offset, low noise and low power while still being able to provide up to 50 mA into a load. The LDO or power delivery amplifier circuit 310 handles slew in less than 3 μs into a 3Ω load with a 0.01 μF capacitance and has a bandwidth of greater than 25 MHz.

The bias amplifiers of the LDO amplifier circuit 310 are operable to maintain a relatively constant voltage (e.g., 2.8 volts) regardless of the input signal, while the LDO amplifier of the LDO amplifier circuit 310 is operable to adjust the power output to the power amplifiers 140 and 142. In addition, the bias amplifiers are operable to bias the power amplifiers 140 and 142 and to turn on and off the power amplifiers 140 and 142.

The clamping circuit 306 comprises a built-in offset such that the power controller 150 will not turn on the power amplifier 140 or 142 with zero voltage applied to the input (Vramp), thereby reducing RF leakage in the off state, while still powering up in less than 3 microμseconds, and a second high side clamp is added to not allow too much current if too much voltage is supplied (ruggedness improvement). The bias amplifier circuit 308 comprises two bias amplifiers with resistor-divider feedback loops. As illustrated, one bias amplifier provides current for a high-band (in this example, DCS) power amplifier 140, with more current provided in a linear and polar EDGE mode than in a standard mode. Similarly, the other bias amplifier provides current for a low-band (in this example, GSM) power amplifier 142, with more current provided in a linear and polar EDGE mode than in a standard mode.

Normal CMOS input structures cause a continuous current to flow to ground because the input potential is biasing the inverter into a linear region of operation. In addition, the inputs are subjected to high RF fields and potential grounding reference issues associated with very high current applications exist. On the other hand, the input buffers eliminate leakage current associated with partially turned-on input stages. In addition, the N-channel transistor, which is in series with both the reference voltage and the buffer amplifier, is used to provide an on-board internal reference for the LDO amplifier circuit 310.

The P-channel power driver FET is a unique bent gate approach to maximize conductance. The goal is to provide the lowest Rds on per unit area in CMOS without latchup. Plugs are used and the surrounding area serves as an active source area. In addition, the Schmitt trigger has the advantage of some noise rejection and can tolerate a slow rise time input. A two-sided Schmitt trigger sets for an initial trip point of 0.8V with a 1.8V input and a supply voltage of 2.9V. Weighing the N-channel transistor forces the trip point to be close to the N-channel transistor threshold. In this approach, a supply ratio changes over a range of 2 to 1 and is directly dependent on the absolute N-channel transistor threshold voltage. The peaking response has a frequency that is approximately an order of magnitude higher than the frequency of the pass band.

Because the linear modulation requirements of linear and polar EDGE are influenced not only by the power amplifier characteristics but also by the supply delivery system, the group delay flatness of phase distortion is important in linear and polar EDGE. For group delay flatness, the most intuitive method is to increase the bandwidth by increasing the current. In the present invention, pole zero placement follows a Chebechev-like response to flatten out the amplitude and group delay response. This pushes the point where phase distortion takes over. The bandwidth and gain of an amplifier are inversely related to the square root of the area divided by the current through the device. On the other hand, reducing the input channel length effectively increases the bandwidth without adversely affecting the gain.

A power down circuit technique separates the circuit from the supply by using an N-channel switch with all of the analog active circuitry (N-channel sources connected to ground). This technique eliminates the need for an input supply reference voltage that would be used by an inverter input stage, resulting in a standby current of less than 1 μA. A master/slave architecture is employed whereby the TX_EN (transmit enable pin) acts as the master gating off any potential leakage current independent of the input level presented at any other pin. The sum of the entire power down current and leakage current is less than 4 μA over process voltage and temperature, including pull up and pull down currents.

In this way, for this particular embodiment, improved power handling is achieved with both circuit techniques and advanced packaging, which includes copper bump technology and power dissipating copper columns. The design of this embodiment takes advantage of a 2 KΩ/square poly resistor, in addition to a 3 fF/μm$^2$ accumulation capacitor (gate thickness 110 A°). The process uses five layers of metal with the top being reserved for a copper pedestal or column interconnect. The fifth layer of metal holds the copper rigid and forms an attachment location without sacrificing lower layer interconnects. Copper has many attributes including improved ball density and improved thermal conductivity over solder balls, such as those formed from tin lead composite that is commonly used. It will be understood that other embodiments may use any suitable material as an alternative to copper. Higher capacitance per unit area over MIM or poly to poly capacitors, which is typically 1 fF/μm$^2$, provides improved density and smaller die area.

Group delay flatness of better than ±10 ns over a bandwidth of 10 KHz to 500 KHz is realized in this embodiment, with a potential to extend this to greater than 7 MHz for WCDMA applications. A peaking second order response with an intentional zero can effectively create an approximate flat group delay and linear phase response. This is an underdamped response with a lower phase margin. Furthermore, the introduction of a feedfoward zero which can be obtained by the input capacitor of the FET gate can be used to reduce the absolute group delay. Because the magnitude of the total variation is a percentage of the absolute value of the delay, the variation can be reduced if the absolute value is reduced. This is accomplished by the feed forward path. Impressive specification of group delay flatness of less than ins, with a total absolute spread of ±10 nanoseconds, may be provided without trim. Amplitude variation of less than ±0.3 dB may also be provided to 3 MHz, which meets the requirements for WCDMA and linear and polar EDGE. In addition, flatness is dramatically improved when the region of interest is moved from the band edge. This implies that bandwidth of the amplifier is increased.

Signal tracking power amplifier supply delivery systems improve both total dissipated power and signal distortion. Current delivery can exceed 4 A instantly with 2 A continuous. To minimize size and current, device mirroring from near sub-threshold continuously-enabled on board reference is used. The reference sustains a 2V peak-to-peak RF level on the supply with less than 20 mV drop. The HBT GaAs power amplifiers 140 and 142 are able to sustain a 40:1 VSWR. Interburst recovery time is less than 3 μs settling to 10 mV, with a typical off standby current of less than 2 μA (including input control pull down current). Spot noise at 20 MHz is less than 10 nv/rtHz for both the bias amplifiers and the power LDO amplifier.

The linear CMOS power controller 150 is used with GaAs HBTs power amplifiers 140 and 142, meeting the full requirements of GSM/EDGE adjacent channel performance with an efficiency of better than 40%. Spectral regrowth is minimized particularly under high power output conditions.

A low Vclamp offset voltage is created, where the output does not change until the input goes above 0.2V, introducing a tracking offset current at the negative input summing node. The same resistor material (Hi Resistance polysilicon 2 KΩ/square) is used as the gain-setting resistors that tracks over process voltage and temperature. Ensuring a reproducible and consistent gain characteristic eliminates the need for costly active trim or calibration.

A separate 1.6V reference is developed in order to provide an isolated direct reference for the input clamp. This clamps the input ramp voltage 222 from ever allowing the output to go beyond 3.8V. Having this voltage isolated also removes switching transients and glitches from appearing elsewhere in the circuit. Finally, a 2.8V reference is used to set the input stage supply voltage of the VCC amplifier, which drives the collector of the power amplifier 140 or 142. Making this node supply independent (fixed 2.8V) results in more controlled operation over the input common mode range (0~1.6V) plus improved supply noise rejection is achieved. Furthermore, a rail to rail input stage can be replaced with a single P-channel input stage, again improving noise and bandwidth due to lower capacitance loading in the folded cascode active load circuit. A weak N-channel input stage is also included to keep the amplifier from switching states when the amplifier is out of range (see schematic).

Figure 4:
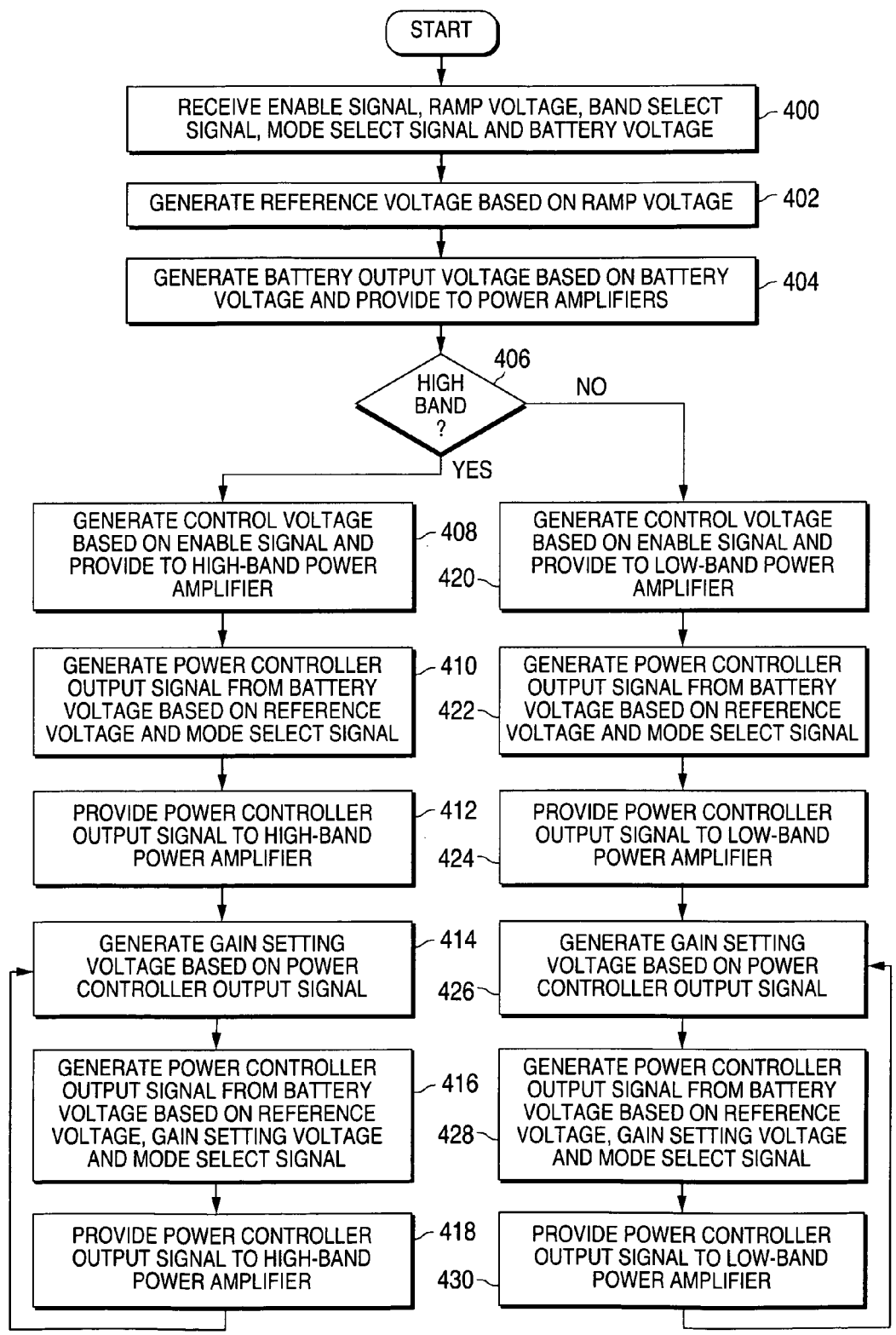
FIG. 4 is a flow diagram illustrating a method for operating the power controller of FIGS. 1-3 in accordance with one embodiment of the present invention.

FIG. 4 is a flow diagram illustrating a method for operating the power controller 150 in accordance with one embodiment of the present invention. The method begins at step 400 where the power controller 150 receives the enable signal 220, the ramp voltage 222, the band select signal 224 and the battery voltage 226. The power controller 150 is enabled by the receipt of the appropriate enable signal 220. In addition, the power controller 150 may also receive a mode select signal.

At step 402, the power controller 150 generates the reference voltage 250 based on the ramp voltage 222 by using the input capacitor 214. At step 404, the power controller 150 generates the battery output voltage 234 based on the battery voltage 226 and provides the battery output voltage 234 to the power amplifiers 140 and 142.

At decisional step 406, the power controller 150 makes a determination regarding whether the wireless communication device 100 is operating in a high-band state based on the band select signal 224. If the wireless communication device 100 is operating in a high-band state, the method follows the Yes branch from decisional step 406 to step 408.

At step 408, the power controller 150 generates the control voltage 230 based on the enable signal 220 and provides the control voltage 230 to the high-band power amplifier 140 through the bias buffer 204. At step 410, the power controller 150 generates the power controller output signal 236 from the battery voltage 226 based on the reference voltage 250 and the mode select signal, if available.

For one embodiment, the power controller 150 injects either no additional current or a specified amount of additional current based on the mode in which the wireless communication device 100 is operating as identified by the mode select signal. For example, the power controller 150 may inject a specified amount of additional current if the wireless communication device 100 is operating in a linear and polar EDGE mode and no additional current if the wireless communication device 100 is operating in a standard mode.

At step 412, the power controller 150 provides the power controller output signal 236 to the high-band power amplifier 140. At step 414, the power controller 150 receives the voltage requirement from the baseband (open loop) 236, resulting in the generation of a gain setting voltage 252.

At step 416, the power controller 150 generates the power controller output signal 236 from the battery voltage 226 based on the reference voltage 250 and the gain setting voltage 252, in addition to any mode select signal. For one embodiment, the power controller 150 compares the reference voltage 250 to the gain setting voltage 252 and, if a difference exists between the voltages 250 and 252, makes an adjustment to the power controller output signal 236 in order to reduce the difference.

At step 418, the power controller 150 provides the power controller output signal 236 to the high-band power amplifier 140, after which the method returns to step 414 where the power controller 150 continues to sense the voltage of the power controller output signal 236. It will be understood that the method may be repeated any time the band select signal 224 received by the power controller 150 changes. Also, the method comes to an end when the enable signal 220 changes, thereby disabling the power controller 150.

Returning to decisional step 406, if the wireless communication device 100 is not operating in a high-band state, the wireless communication device 100 is operating in a low-band state, and the method follows the No branch from decisional step 406 to step 420. At step 420, the power controller 150 generates the control voltage 232 based on the enable signal 220 and provides the control voltage 232 to the low-band power amplifier 142 through the bias buffer 206.

At step 422, the power controller 150 generates the power controller output signal 236 from the battery voltage 226 based on the reference voltage 250 and the mode select signal, if available. For one embodiment, the power controller 150 injects either no additional current or a specified amount of additional current based on the mode in which the wireless communication device 100 is operating as identified by the mode select signal.

At step 424, the power controller 150 provides the power controller output signal 236 to the low-band power amplifier 142. At step 426, the power controller 150 receives the voltage requirement from the baseband (open loop) 236, resulting in the generation of a gain setting voltage 252.

At step 428, the power controller 150 generates the power controller output signal 236 from the battery voltage 226 based on the reference voltage 250 and the gain setting voltage 252, in addition to any mode select signal. For one embodiment, the power controller 150 compares the reference voltage 250 to the gain setting voltage 252 and, if a difference exists between the voltages 250 and 252, makes an adjustment to the power controller output signal 236 in order to reduce the difference.

At step 430, the power controller 150 provides the power controller output signal 236 to the low-band power amplifier 142, after which the method returns to step 426 where the power controller 150 continues to sense the voltage of the power controller output signal 236. It will be understood that the method may be repeated any time the band select signal 224 received by the power controller 150 changes. Also, the method comes to an end when the enable signal 220 changes, thereby disabling the power controller 150.

Figure 5:
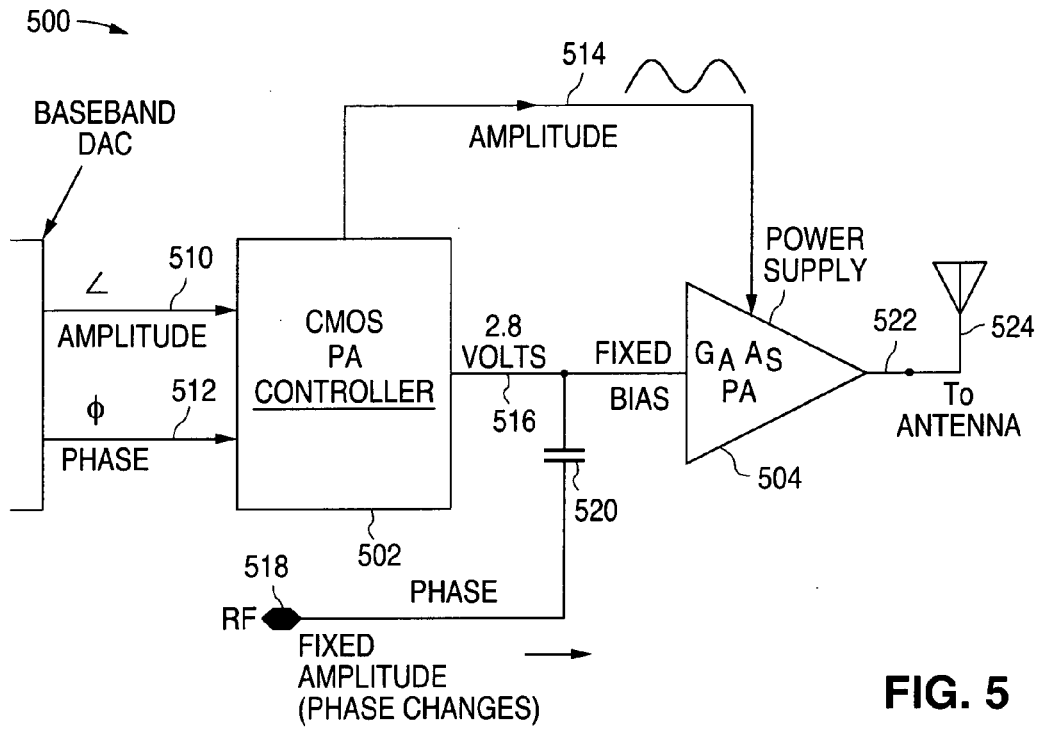
FIG. 5 is a block diagram illustrating an open loop polar modulation scheme for use in the wireless communication device of FIG. 1 in accordance with one embodiment of the present invention.

FIG. 5 is a block diagram illustrating the open loop polar modulation scheme 500 for use in the wireless communication device 100 in accordance with one embodiment of the present invention. The illustrated open loop polar modulation scheme 500 comprises a CMOS power controller 502 that corresponds to the power controller 150 and a GaAs power amplifier 504 that corresponds to one of the power amplifiers 140 or 142. Thus, it will be understood that the open loop polar modulation scheme 500 may comprise a second GaAs power amplifier, with one a high-band power amplifier and the other a low-band power amplifier.

The power controller 502 is operable to receive an amplitude input 510 and a phase input 512 from a baseband digital-to-analog converter. The power controller 502 is also operable to generate an amplitude output 514 and a relatively fixed bias voltage 516 (e.g., 2.8 Volts), both of which are provided to the power amplifier 504. In addition, a relatively fixed amplitude radio frequency input 518 provides phase information to the power amplifier 504 by adding phase information to the bias voltage 516 through a capacitor 520. The power amplifier 504 is operable to receive the amplitude output 514 and the bias voltage 516 and to generate an output signal 522 for transmission over an antenna 524, which corresponds to the antenna 102. Thus, instead of having a replica of the output signal applied to the bias voltage 516, the power amplifier 504 is implemented as a pure linear gain stage, resulting in an open loop polar modulation scheme 500.

Figure 6:
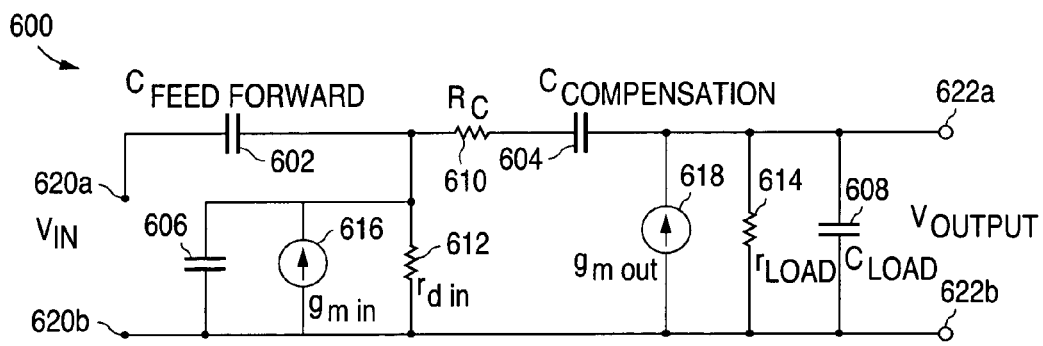
FIG. 6 is a circuit diagram illustrating an equivalent circuit for the LDO amplifier of FIG. 3 in accordance with one embodiment of the present invention.

FIG. 6 is a circuit diagram illustrating an equivalent circuit 600 for the LDO amplifier from the LDO amplifier circuit 310 in accordance with one embodiment of the present invention. The equivalent circuit 600 for the LDO amplifier comprises a plurality of capacitors 602, 604, 606 and 608, a plurality of resistors 610, 612, 614, and a plurality of current sources 616 and 618. The LDO amplifier is operable to receive an input voltage at input nodes 620a-b and to generate an output voltage at output nodes 622a-b in the equivalent circuit 600.

The capacitor 602 comprises a feed forward capacitor, the capacitor 604 comprises a compensation capacitor, the capacitor 606 comprises an input capacitor, and the capacitor 608 comprises a load capacitor. The resistor 610 comprises a compensation resistor, the resistor 612 comprises an input resistor, and the resistor 614 comprises a load resistor. The current source 616 comprises an input current source and the current source 618 comprises an output current source.

Figure 7:
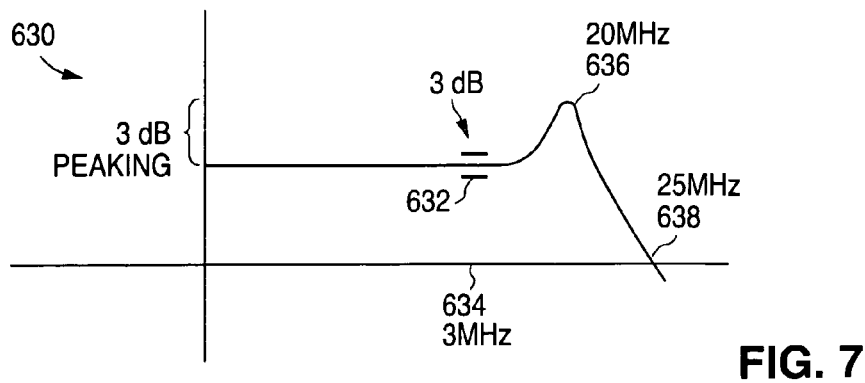
FIG. 7 is a graph illustrating a phase response and peaking in the equivalent circuit of the LDO amplifier of FIG. 6.

FIG. 7 is a graph 630 illustrating a phase response and peaking in the equivalent circuit 600 of the LDO amplifier. The amplitude variation 632 is less than ±0.3 dB up to a maximum flat point 634 of at least 3 MHz. The peak 636 occurs at approximately 20 MHz and the response falls to a zero point 638 at approximately 25 MHz.

Although the present invention has been described with several embodiments, various changes and modifications may be suggested to one skilled in the art. It is intended that the present invention encompass such changes and modifications as fall within the scope of the appended claims.

What is claimed is:

1. A method for operating a power controller in a wireless communication device, comprising:
   receiving a mode select signal operable to identify one of a plurality of modes for the wireless communication device;
   generating a power controller output signal using an open loop polar modulation scheme, the power controller output signal operable to control power delivered to a high-band power amplifier and a low-band power amplifier, wherein the power controller output signal is determined using an amount of power currently being generated and a lookup table that has at least one value of power that corresponds to at least one level of current, wherein the lookup table stores power data corresponding to the power used by the high-band power amplifier and the low-band power amplifier;
   determining a band state for the wireless communication device;
   providing the power controller output signal to the high-band power amplifier when the band state is a high-band state and to the low-band power amplifier when the band state is a low-band state; and
   injecting a specified amount of current based on the mode identified by the mode select signal, into the high-band power amplifier when the band state is the high-band state and into the low-band power amplifier when the band state is the low-band state.

2. The method of claim 1, the power controller output signal further generated without using a sense resistor.

3. The method of claim 2, further comprising:
   receiving a ramp voltage; and generating a reference voltage based on the ramp voltage.

4. The method of claim 1, further comprising receiving an enable signal operable to enable and disable the power controller.

5. The method of claim 1, further comprising receiving a band select signal, wherein determining the band state for the wireless communication device comprises determining the band state for the wireless communication device based on the band select signal.

6. A power controller for controlling power in a wireless communication device, comprising:
   an RC filter operable to filter a power controller output signal generated using an open loop polar modulation scheme, the power controller output signal operable to control power delivered to a high-band power amplifier and a low-band power amplifier, wherein the power controller output signal is determined using an amount of power currently being generated and a lookup table that has at least one value of power that corresponds to at least one level of current, wherein the lookup table stores power data corresponding to the power used by the high-band power amplifier and the low-band power amplifier;
   a gain setting resistor coupled to the RC filter, the gain setting resistor operable to generate a gain setting voltage based on the filtered power controller output signal;
   a gain setting amplifier coupled to the RC filter and the gain setting resistor, the gain setting amplifier operable to receive a reference voltage and the gain setting voltage, to compare the reference voltage to the gain setting voltage to determine a difference, and to amplify the difference to generate a gain setting amplifier output voltage; and
   an output transistor coupled to the gain setting amplifier, the output transistor operable to receive the gain setting amplifier output voltage and to generate the power controller output signal based on the gain setting amplifier output voltage;
   wherein the power controller is further operable to receive a mode select signal identifying one of a plurality of modes for the wireless communication device and to inject a specified amount of current, based on the mode identified by the mode select signal, into the high-band power amplifier when a band state for the wireless communication device is a high-band state and into the low-band power amplifier when the band state is a low-band state.

7. The power controller of claim 6, the output transistor further operable to provide the power controller output signal to the high-band power amplifier when the wireless communication device is in the high-band state and to the low-band power amplifier when the wireless communication device is in the low-band state.

8. The power controller of claim 7, further comprising:
a bandgap bias generator operable to generate a control voltage and an activation signal, the control voltage operable to activate one of the power amplifiers;
a high-band bias buffer operable to buffer the control voltage based on the activation signal when the wireless communication device is in the high-band state and to provide the control voltage to the high-band power amplifier; and
a low-band bias buffer operable to buffer the control voltage based on the activation signal when the wireless communication device is in the low-band state and to provide the control voltage to the low-band power amplifier.

9. The power controller of claim 8, wherein the power data stored in the lookup table comprises power data generated during production of the wireless communication device.

10. The power controller of claim 8, further comprising a pair of switches operable to activate one of the bias buffers based on a band select signal.

11. The power controller of claim 6, further comprising an input capacitor coupled to the gain setting amplifier, the input capacitor operable to receive a ramp voltage and to generate the reference voltage based on the ramp voltage.

12. A wireless communication device, comprising:
a high-band power amplifier for use when the wireless communication device is in a high-band state;
a low-band power amplifier for use when the wireless communication device is in a low-band state; and
a power controller coupled to the high-band power amplifier and to the low-band power amplifier, the power controller operable to:
generate a power controller output signal using an open loop polar modulation scheme, the power controller output signal operable to control power delivered to the high-band power amplifier and the low-band power amplifier;
determine a band state for the wireless communication device; and
provide the power controller output signal to the high-band power amplifier when the band state is the high-band state and to the low-band power amplifier when the band state is the low-band state;
wherein the power controller is operable to generate the power controller output signal using an amount of power currently being generated and a lookup table that has at least one value of power that corresponds to at least one level of current, wherein the lookup table stores power data corresponding to the power used by the high-band power amplifier and the low-band power amplifier; and
wherein the power controller is further operable to receive a mode select signal identifying one of a plurality of modes for the wireless communication device and to inject a specified amount of current, based on the mode identified by the mode select signal, into the high-band power amplifier when the band state is the high-band state and into the low-band power amplifier when the band state is the low-band state.

13. The wireless communication device of claim 12, the power controller further operable to compare a reference voltage to a gain setting voltage to determine a difference and to generate the power controller output signal based on the difference between the reference voltage and the gain setting voltage.

14. The wireless communication device of claim 13, the power controller further operable to receive a ramp voltage and to generate the reference voltage based on the ramp voltage.

15. The wireless communication device of claim 12, the power controller further operable to receive an enable signal operable to enable and disable the power controller.

16. The wireless communication device of claim 12, the power controller further operable to receive a band select signal and to determine the band state for the wireless communication device based on the band select signal.

* * * * *